June 14, 1955 J. J. O'BRIEN 2,710,634
MOBILE APPARATUS FOR BORING HOLES IN
TREE STUMPS, PLANKING, AND THE LIKE
Filed June 26, 1952 3 Sheets-Sheet 1
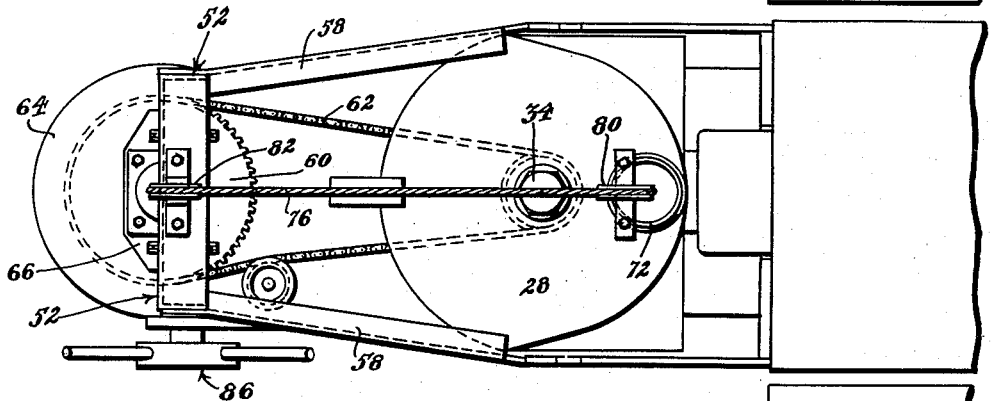
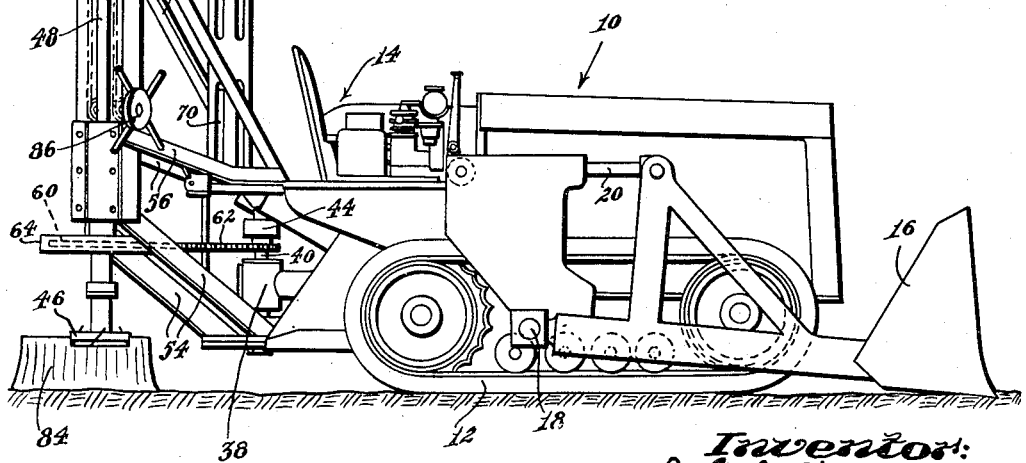

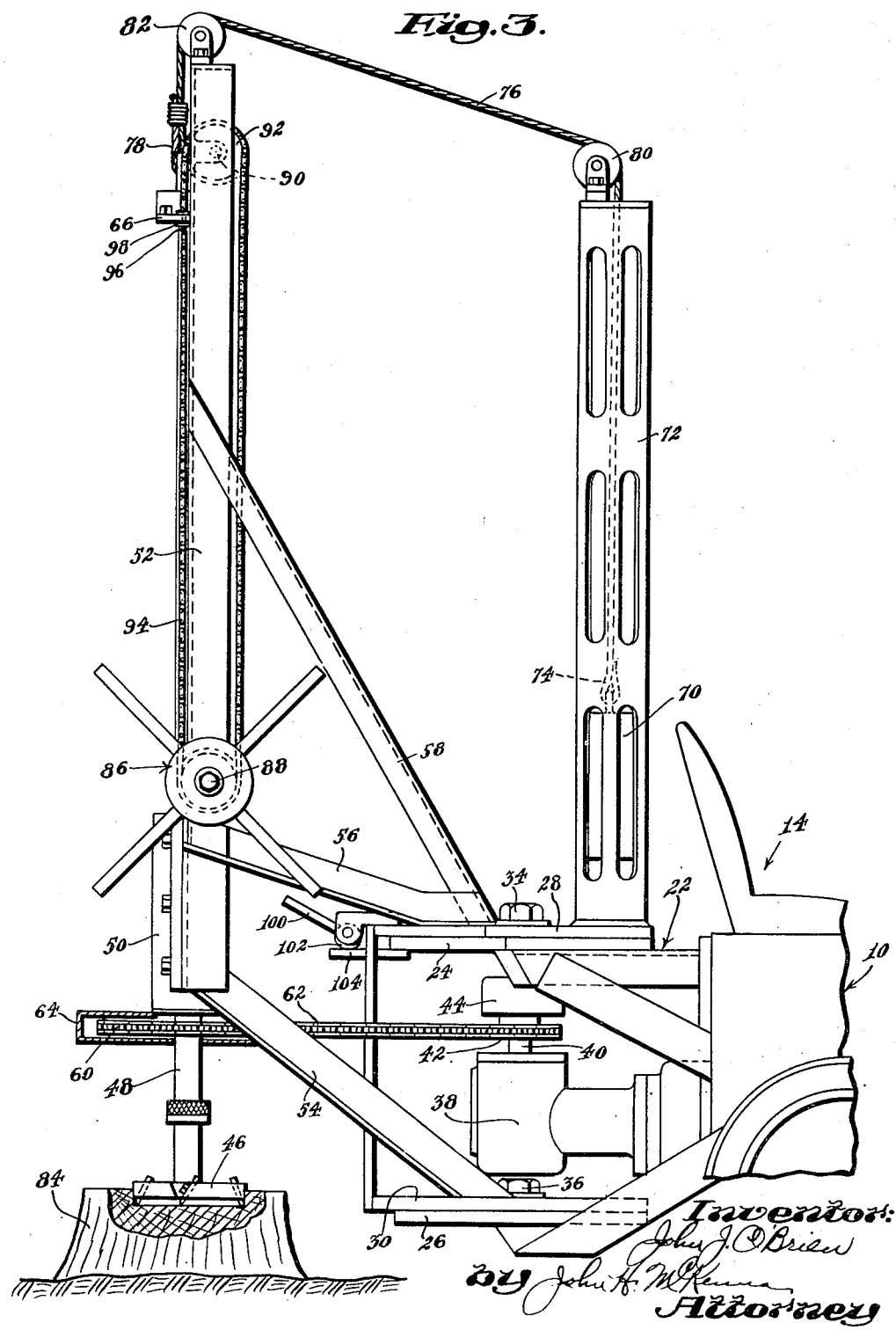

June 14, 1955  J. J. O'BRIEN  2,710,634
MOBILE APPARATUS FOR BORING HOLES IN
TREE STUMPS, PLANKING, AND THE LIKE
Filed June 26, 1952  3 Sheets-Sheet 3
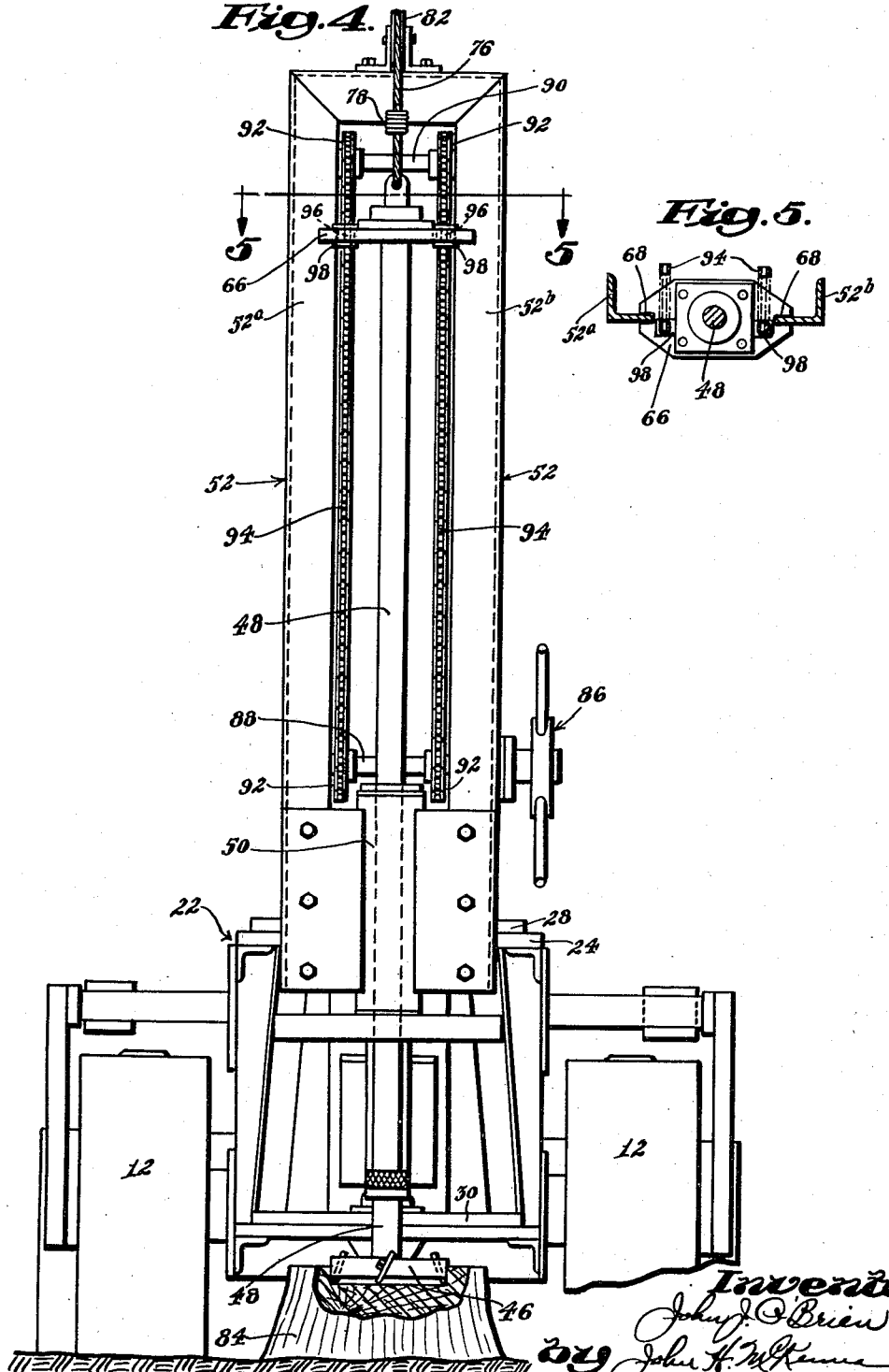

United States Patent Office 2,710,634
Patented June 14, 1955

2,710,634

MOBILE APPARATUS FOR BORING HOLES IN TREE STUMPS, PLANKING, AND THE LIKE

John J. O'Brien, Elmhurst, N. Y.

Application June 26, 1952, Serial No. 295,709

1 Claim. (Cl. 144—2)

This invention relates to improvements in mobile boring apparatus. More particularly it provides a mobile boring unit having general utility for boring holes in floors, piers, ice, etc., and which will be found especially useful and advantageous for removing tree stumps to a suitable depth in the ground without appreciably disturbing the regions immediately surrounding the stumps. The invention makes it feasible to relatively quickly bore away any objectionable portion of a tree stump by means of a boring unit whose power-operated boring cutter may be conveniently and quickly manipulated to cut away the full area of a tree trunk to a desired distance below the surface of the ground.

It is among the objects of the invention to provide a powered mobile boring unit which preferably will be of a type capable of being driven from place to place, and which includes a rotary boring cutter which is rotatable about and movable along a generally vertically disposed axis which axis is shiftable in directions generally transversely of the directions of extent of the said axis, whereby the unit may be maneuvered, with appropriate transverse movement of the cutter axis, to locate the cutter over a location where a hole is to be bored, followed by vertical lowering of the cutter into boring relation to planking, or a tree stump, or other object, at the said location.

Another object of the invention is to provide a mobile boring unit wherein a rotary boring cutter is mounted on a powered vehicle adapted to be driven from place to place, the source of power for driving the vehicle being utilized for driving said cutter about a generally vertical axis, and the cutter being mounted for swinging movements generally transversely of the directions of extent of said axis, and being movable along said axis into cutting and boring relation to work in which a hole is to be bored.

Yet another object of the invention is to provide a mobile boring unit wherein a tractor-vehicle is adapted to be driven and maneuvered into a predetermined relation to a tree stump or other object which is to be worked upon, and wherein a rotary boring cutter is mounted at one end of the tractor-vehicle and driven through a power take-off from the tractor-vehicle, with provision for vertical and generally transverse movements of the cutter relative to the tractor-vehicle.

It is, moreover, my purpose and object generally to improve the structure and operative efficiency and utility of boring mechanisms and particularly such mechanisms of the mobile unit variety which may be driven from place to place and readily maneuvered for effective placing of the boring cutter in any boring operation.

In the accompanying drawings:

Fig. 1 is a top plan view of the cutter-carrying end portion of a mobile boring unit embodying features of my invention;

Fig. 2 is a side elevation of the entire mobile unit, on a smaller scale, illustrating the boring cutter in cutting relation to a tree stump, the cutter and its supporting frame being swung toward the eye from their positions of Fig. 1;

Fig. 3 is a side elevation of the cutter, its supporting frame, and the adjacent end portion of the carrying vehicle, on the scale of Fig. 1;

Fig. 4 is an end elevation of the mobile boring unit looking from the left at the unit as shown in Fig. 3, on the scale of Figs. 1 and 3; and Fig. 5 is a cross-sectional view on line 5—5 of Fig. 4.

Referring to the drawings, a conventional diesel-powered caterpillar type of tractor is represented generally at 10 in Fig. 2, the tread members of which are represented diagrammatically at 12, and the operator's seat being shown at 14. The particular tractor shown is equipped with the bulldozer blade 16 at the front end which is adapted to be raised about the pivot 18 by power actuation of rods 20, one at each side of the tractor, at the will of the operator.

According to the invention, a frame structure, indicated generally at 22 (Figs. 3 and 4), is secured to a rear end portion of the tractor and rigidly supports the two vertically spaced horizontally disposed plate elements 24, 26. Two additional upper and lower plate elements 28, 30 are rigidly connected together at 32 in spaced parallel relation for resting on the plates 24, 26 respectively, and coaxial pivot bolts 34, 36 secure the pairs of plates against relative displacement, but permit rotation of the rigidly interconnected plates 28, 30 on the plates 24, 26 about the common axis of the pivot bolts 34, 36.

A power take-off from the tractor is indicated generally at 38, projecting rearwardly within the frame 22. It includes the vertical shaft 40 which is driven whenever the tractor engine is running. A sprocket 42 is loose on shaft 40 but is adapted to be connected for rotation with shaft 40 through the medium of a suitable clutch mechanism indicated at 44.

The boring cutter 46 is mounted at the lower end of a vertically disposed long shaft 48 which extends slidably and rotatably through the guide sleeve 50 at the lower end of a vertical frame 52 which is rigidly supported on but outward from the plate elements 28, 30 by means of the angularly related supporting members 54, 56 and 58. Shaft 48 has a sprocket 60 fixed thereon, and shaft 48 is driven from shaft 40 through the clutch-controlled sprocket 42 on shaft 40 around which and sprocket 60 a chain 62 is trained. A guard 64 preferably encloses the engaging portions of sprocket 60 and chain 62.

As best seen in Figs. 4 and 5, the upper end of shaft 48 has fixed thereon the horizontally disposed guide plate 66 which is notched at 68 for reception in each notch of an edge portion of a different one of the spaced uprights 52a, 52b of frame 52, so that the upper end of the shaft is maintained in its position of Fig. 5, centrally disposed between the uprights of frame 52. However, shaft 48 and its guide plate 66 are vertically movable along the uprights of frame 52 which constitute tracks along which guide plate 66 is slidable.

Shaft 48 constantly is biased to the upper limit of its vertical movement by a counter-weight 70 (Fig. 3) which is slidable within the vertical housing 72 and which is connected at 74 to one end of a cable 76 whose other end is connected at 78 to vertical shaft 48. Housing 72 is mounted on the upper pivoted plate member 28 and is equipped at its upper end with a pulley 80 over which cable 76 extends. A similar pulley 82 is mounted on the upper end of vertical frame 52 over which cable 76 engages on its course to its connection at 78 to the upper end of shaft 48.

Manual lowering of shaft 48, and its cutter 46, to engage the cutter with work, such as the tree stump 84, is accomplished by rotation of the manual actuator 86 in counter-clockwise direction in Fig. 3, the weight 70 acting to lift the shaft and cutter when actuator 86 is released. The actuator 86 is fixed on one end of a sprocket shaft 88 which extends horizontally between the uprights 52a, 52b of the vertical frame 52, with a suitable bearing in each upright. The shaft and actuator are located at a convenient height to be reached by a person standing on the ground or other supporting surface adjacent to the work upon which the cutter 46 is to act.

A comparable sprocket shaft 90 is mounted on and extends horizontally between the uprights 52a, 52b above the upper limit of movement of guide plate 66. Each sprocket shaft 88 and 90 has two sprockets 92 fixed thereon and two chains 94 engage around the sprockets, each chain engaging around a different sprocket on each shaft, and each having a link 96 extending through the guide plate 66 and secured to the guide plate at 98, whereby the guide plate 66, shaft 48 and cutter 46 are carried up or down as the connected portions of the chains 94 move up or down.

Assuming that the illustrated tree stump 84 is to be cut away to a suitable distance below the surface of the ground, the tractor unit, with its front bulldozer blade 16 elevated, will be backed into a position, such as that illustrated in Fig. 2, to bring the elevated cutter 46 within range of the stump. Then the front blade 16 may be lowered to act as a brace at the front end of the tractor unit, following which the operator will actuate the clutch 44 for effecting drive connection through chain 62 between the shafts 40 and 48.

Cutter-carrying shaft 48, and its supporting frame, next may be manually swung as needed about the pivot bolts 34, 36, to suitably locate the cutter 46 over a desired portion of the tree trunk, and the frame preferably is secured in a selected position of adjustment as by pulling down on pivoted lever 100 (Fig. 3) on the upper pivoted plate member 28. The pivoted portion of lever 100 is eccentric at 102 and coacts with a fixed member 104 on the fixed plate 24 for clamping the swingable frame in any particular position thereof around pivot bolts 34, 36.

The operator, or other attendant, now may lower the cutter 46 into cutting engagement with stump 84, by means of actuator 86, and the cutter will bore into the stump to whatever depth is desired. When actuator 86 is released, counter-weight 70 lifts shaft 48 to free the cutter, after which the frame and cutter may be swung either to right or left, after loosening eccentric clamp 100, to position the cutter for boring into another portion of the stump.

It will be obvious that repeated boring descents of the cutter, following adjustments of the position of the cutter relative to a stump, can relatively quickly remove the stump to any desired depth below the ground without appreciably disturbing the region immediately surrounding the stump. Cutter 46 preferably will be of the variety disclosed in my Patent No. 2,643,692, granted June 30, 1953, and may be of a diameter best suited for any particular stump-removing operation.

While the invention will be found to have particular utility for removing tree stumps, it may be used effectively for boring counter-sunk holes through the planking of wharves, and the like, where it has been found desirable, as a fire-protective measure, to provide openings through the planking at suitably spaced locations throughout the area of a wharf, through which a hose may be inserted in case of fire. Each counter-sunk hole receives a metal sleeve having a cover which is flush with the surface of the wharf and which is readily openable or removable when it may be desired or necessary to direct a hose stream into the region under the wharf planking. When used for boring such holes, the cutter-carrying shaft 48 ordinarily will have two cutters in spaced relation on the shaft, the leading cutter for boring a hole entirely through the planking, and the second cutter, of slightly larger diameter, providing a countersink of predetermined depth and diameter for properly seating therein the metal covered sleeve.

While I have described a preferred embodiment of my invention, it is intended that the patent shall cover, by suitable expression in the appended claims, whatever features of patentable novelty exist in the invention disclosed.

I claim as my invention:

A mobile boring apparatus comprising a powered vehicle adapted to be driven from place to place, power take-off means connected to the vehicle power system and having a generally vertically disposed power take-off shaft, a relatively large area plate element fixed on the vehicle, a second relatively large area plate element resting upon the fixed plate element and rotatable thereon on an axis coinciding with the axis of said power take-off shaft, a relatively long vertically disposed shaft having a boring member on its lower end and having its upper end located substantially above said plate elements, frame elements rigid on said rotatable plate element and extending outward therefrom, at least one of said frame elements extending obliquely outward and upward to a location adjacent to an upper end portion of said shaft, means carried at the outer ends of said frame elements supporting said vertically disposed shaft for both rotational and axial movements, said vertically disposed shaft being swingable about the axis of said second plate element to locate the axis of the shaft in any of various positions, means for locking said second plate element against rotation on the said fixed plate element, a flexible drive connection between said power take-off shaft and said vertically disposed shaft and engaging the shaft below said shaft supporting means of said frame elements for rotating the shaft, a flexible element having one end connected to the upper end of said vertically disposed shaft and having a weight connected to its other end, a vertical hollow guide mounted rigidly on said second plate element and within which said weight is movable, anti-friction means guiding said flexible element on its course leading between its connection to said vertically disposed shaft and its connection to said weight within said hollow guide, and manual means for moving said vertically disposed shaft axially in direction to lift said weight within said hollow guide.

References Cited in the file of this patent

UNITED STATES PATENTS

| | | |
|---|---|---|
| 846,622 | Robinson | Mar. 12, 1907 |
| 1,286,805 | Senz | Dec. 3, 1918 |
| 1,397,324 | Moore | Nov. 15, 1921 |
| 2,418,601 | Richards | Apr. 8, 1947 |
| 2,603,249 | Lawrence | July 15, 1952 |